United States Patent [19]

Rohrman

[11] 3,942,818
[45] Mar. 9, 1976

[54] RESTRAINING DEVICE FOR A DRIVER'S LEG IN A VEHICLE

[76] Inventor: David L. Rohrman, R.R. 8, Box 14, Greenfield, Ind. 46140

[22] Filed: Mar. 31, 1975

[21] Appl. No.: 563,563

[52] U.S. Cl. .............................. 280/150 R; 297/427
[51] Int. Cl.² .......................................... B60R 27/00
[58] Field of Search ................. 280/150 R; 297/427

[56] References Cited
UNITED STATES PATENTS

| | | | |
|---|---|---|---|
| 2,133,443 | 10/1938 | Girl | 280/150 R |
| 2,585,398 | 2/1952 | McIlwraith | 280/150 R |
| 2,592,045 | 4/1962 | Moir | 280/150 R |
| 3,106,425 | 10/1963 | McClintock | 280/150 R |
| 3,179,468 | 4/1965 | Hinzie | 297/427 |

Primary Examiner—Robert R. Song
Attorney, Agent, or Firm—Woodard, Weikart, Emhardt & Naughton

[57] ABSTRACT

A device for restraining movement of a driver's leg. A flexible elongated strap is extendable from a housing. The housing is mountable to the vehicle dashboard with the distal end of the strap being connectable to the seat belt provided for the driver. The strap extends from the dashboard toward the seat belt adjacent the driver's leg thereby restraining movement of the driver's leg in a direction toward the curb side of the vehicle. A spring is provided within the housing being connected between the housing and the strap. The spring is operable to retract the strap within the housing when the strap is not connected to the seat belt. A platform rotatably mounted within the housing supports the spring and strap allowing for relatively frictionless movement as the strap is extended or retracted. An adjusting means is mounted to the outer end portion of the strap allowing adjustment of the length of extension of the strap. The outer end portion of the strap is connectable to the seat belt by a hook mounted to the adjusting means engageable with a clip removably mountable to the driver's seat belt.

6 Claims, 6 Drawing Figures 3,942,818

RESTRAINING DEVICE FOR A DRIVER'S LEG IN A VEHICLE

BACKGROUND OF THE INVENTION

1. Field of the Invention:

This invention is in the field of devices for retraining movement of the driver of a vehicle.

2. Description of the Prior Art:

A number of devices have been provided for restraining movement of occupants within a vehicle such as an automobile. Many of these devices have been provided for safety purposes while other devices have been provided to increase the comfort of the occupants within the vehicle. The automobile seat belt and the inflatable air bag are examples of devices provided to increase the safety of occupants within the vehicle. Various types of seat and door upholstery as well as padded dashboards are examples of devices provided to increase the comfort of the occupants within the vehicle. Disclosed herein is a device to increase the comfort of the driver of the vehicle.

Automobile drivers having a height in excess of 6 feet may experience discomfort when driving an automobile or other vehicle for long periods of time. The distance between the driver's seat and the various pedals within the vehicle is adjustable with this distance being exceptionally great in the case of a long-legged driver. Many modern automobiles have the driver's seat located relatively low with respect to the floor of the automobile; however, the driver's leg generally extends outwardly and downwardly from the driver's seat toward the pedal. In certain cars, it is impossible for the driver to rest his right leg since the leg must be in constant use operating either the accelerator or brake pedal. I have therefore devised a restraining device to allow the driver to rest his right leg against the device while not impeding the driver's ability to operate the accelerator or brake pedal with his right leg.

SUMMARY OF THE INVENTION

One embodiment of the present invention is a device connected between the dashboard and seat of a vehicle for restraining leg movement of the driver comprising a housing, mounting means connected to the housing and being operable to mount the housing to a vehicle adjacent the driver, a flexible elongated member positioned within the housing and extendable therefrom a fixed distance, the member having a distal end portion, spring means mounted in the housing and connected to the member being operable to retract the member into the housing after the member is released from an extended position, adjusting means connected to the member being operable to change the fixed distance, and connecting means connected to the distal end portion of the member being operable to connect the distal end portion of the vehicle when the member extends from the dashboard to the seat adjacent to the driver's right leg limiting movement of the driver's right leg.

It is an object of the present invention to provide a device for restraining leg movement of a driver's leg.

A further object of the present invention is to provide a device for resting a driver's leg while not impeding use of the leg for operation of the accelerator or brake pedal of the vehicle.

An additional object of the present invention is to provide a device allowing extension and retraction of a flexible strap extending between a vehicle dashboard and the driver's seat belt.

Related objects and advantages of the present invention will be apparent from the following description.

DESCRIPTION OF THE PREFERRED EMBODIMENT

Figure 1:
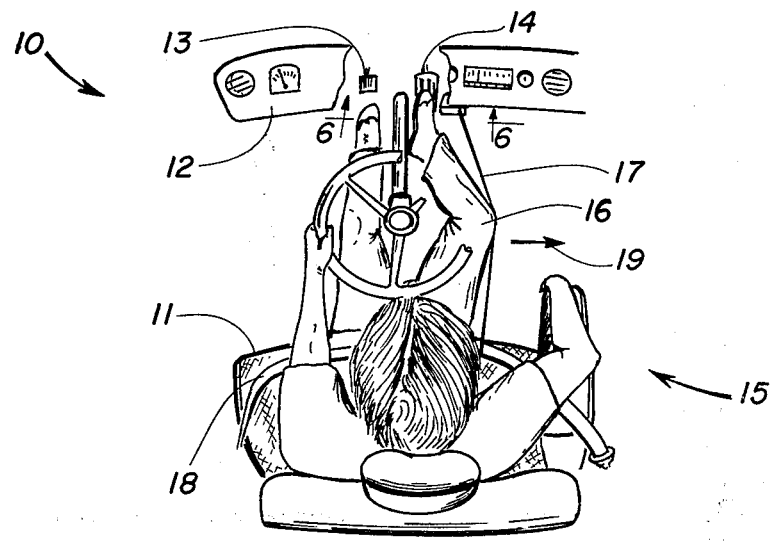
FIG. 1 is a perspective view of the driver's seat portion of a vehicle with the device incorporating the present invention mounted therein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the driver's portion 10 of a vehicle. The vehicle includes a seat 11 and a dashboard 12 with the conventional brake pedal 13 and accelerator 14 shown beneath the dashboard. Driver 15 controls the forward movement of the vehicle by applying pressure with his right leg 16 to either the accelerator 14 or brake pedal 13. Device 17 is mounted to the dashboard and connected to the seat belt 18 in order to restrain movement of leg 16 in the direction of arrow 19.

Figure 2:
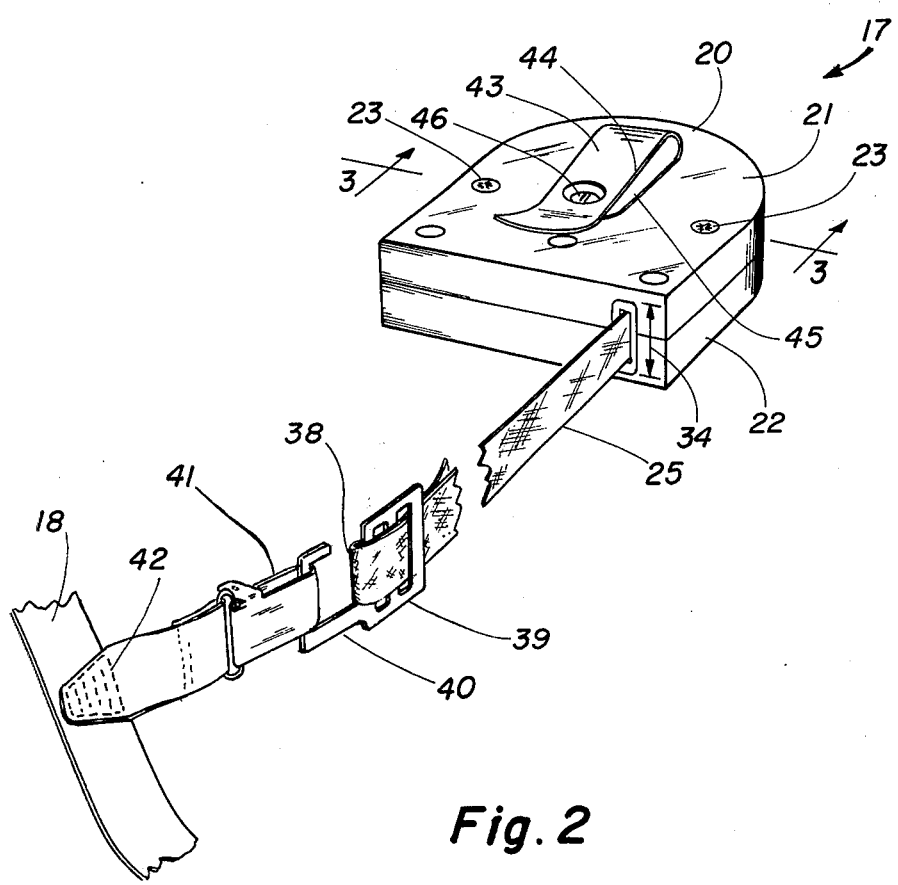
FIG. 2 is a fragmentary perspective view of the device incorporating the present invention.
Figure 3:
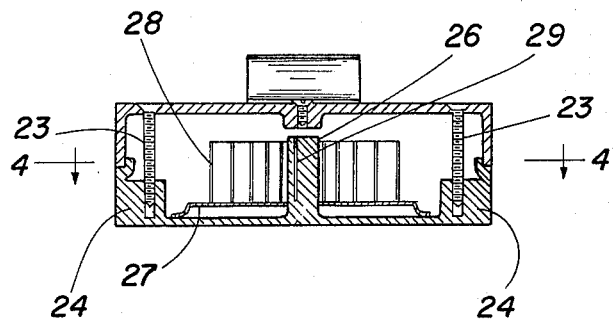
FIG. 3 is a cross sectional view taken along the line 3—3 of FIG. 2 and viewed in the direction of the arrows.

Device 17 includes a housing 20 (FIG. 2) in turn having a top half portion 21 and a bottom half portion 22 secured together by threaded members 23 (FIG. 3) being threadedly received into bosses 24 integrally formed in the bottom half portion 22 of the housing.

A flexible elongated member or strap 25 is positioned within the housing and is extendable therefrom a fixed distance. Boss 26 is integrally attached to bottom half portion 22 and extends upwardly within the housing. A disc-shaped platform 27 is rotatably mounted to boss 26 and is rotatable about the vertical axis of boss 26. A helically wound flat spring 28 rests upon platform 27 having an inner end 29 fixedly attached to boss 26. The outer end 30 of helical spring 28 is fixedly attached to the flexible strap 25. A slot is formed at one end of portions 21 and 22 allowing strap 25 to be extended outwardly from the housing.

Figures 4, 5:
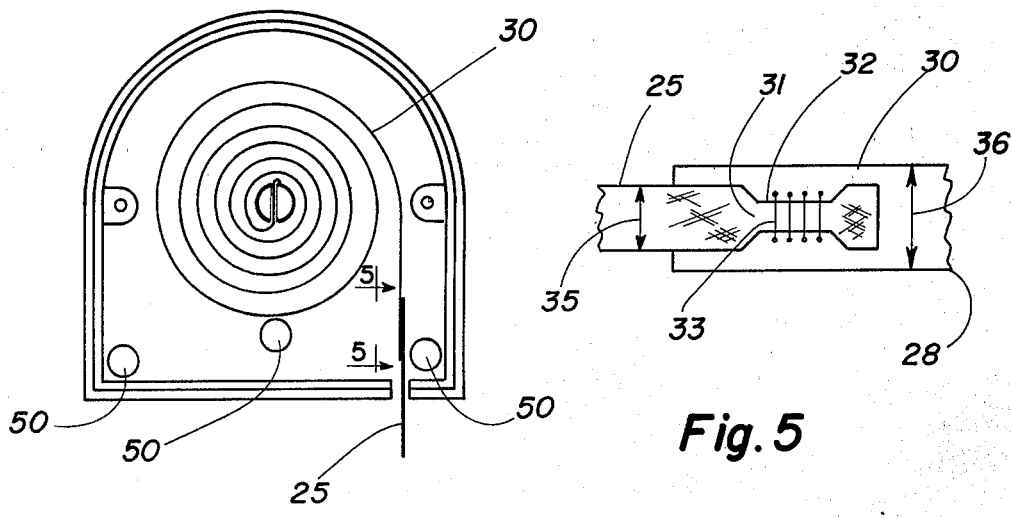
FIG. 4 is a cross sectional view taken along the line 4—4 of FIG. 3 and viewed in the direction of the arrows.
FIG. 5 is an enlarged fragmentary side view looking in the direction of arrows 5—5 showing the attachment of the flexible strap to the spring.

In the embodiment shown in FIG. 5, the flexible strap 25 includes a proximal end portion 31 having a reduced width 32 attached to the distal end 30 of spring 28 by a plurality of staples 33. Spring 28 includes a width greater than the flexible strap 25 and is sized so that the spring will not fit through slot 30 which has a height 34 slightly greater than the width 35 of strap 25 but slightly less than the width 36 of spring 28.

The outer end of strap 25 is sewn or attached by other means to the main body of the strap forming an outer loop 38 in the strap. A butterfly configured conventional adjusting clip 39 is mounted to the outer looped end 38 of the strap allowing the length of the strap to be increased or shortened therefore allowing control of the maximum extended length of the strap. A J-shaped hook 40 is fixedly attached to one end of clip 39 and is hookingly engageable with a looped wire 41 fixedly attached to an alligator type clip 42 removably attached to the seat belt 18. Clip 42 is also of conventional design having a pair of opposite jaws engageable with the opposite sides of the seat belt and being lockingly closable securing the seat belt between the opposite jaws of the clip.

Figure 6:
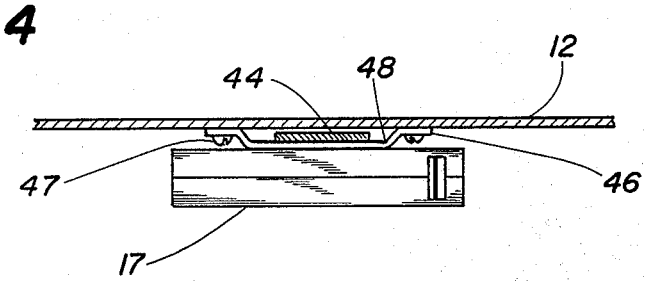
FIG. 6 is an enlarged cross sectional view taken along the line 6—6 of FIG. 1 and viewed in the direction of the arrows showing the mounting of the housing to the dashboard.

A U-shaped clip or clasp 43 has a pair of spaced apart walls 44 and 45 with wall 45 fixedly attached to the top portion of the housing by fastening device 46. Clasp 43 is used to mount the housing to the dashboard of the vehicle. In one embodiment, the wall of the dashboard is slipped between walls 44 and 45. In many cases, the dashboard wall is sufficiently thick so as to not fit between walls 44 and 45. In the latter case, a bracket 46 (FIG. 6) is fixedly attached to dashboard 12 by fastening devices 47. Bracket 46 includes a wall 48 spaced apart from the dashboard to mountingly receive wall 44 of clasp 43 between wall 48 and the dashboard thereby mounting the housing to the vehicle. An alternate method of mounting the housing to the dashboard includes attaching directly the housing to the dashboard by threaded members. Three holes 50 are provided in the upper portion 21 of the housing with threaded members being extendable through the apertures and being threadedly received by the dashboard. Access holes (not shown) are provided in the lower half portion 22 of the housing to facilitate the insertion of a tool into the housing for attachment of the threaded member to the dashboard.

The spring is designed so as to be completely retracted when the belt is completely withdrawn from the housing except for the distal end portion of the belt. The clasp securing the housing to the dashboard includes a pair of walls 44 and 45 which are spring biased together thereby securing the housing more tightly to the dashboard. The device disclosed herein is particularly advantageous in that the device reduces the muscle strain from the driver's right leg since the driver rests his right leg against strap 25. Best results are obtained when the housing is mounted in line with the accelerator or between the accelerator and steering column. In actual measurements, a man 6 feet 4 inches tall, weighing 160 pounds exerted 2½ to 3½ pounds of pressure onto the strap with the driver's heel on the floor and the foot on the gas pedal. With the driver's heel on the floor and off of the gas pedal, the leg exerted 4½ to 5½ pounds of pressure on the strap.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A device connected between the dahsboard and seat of a vehicle for restraining leg movement of the driver comprising:

a housing;

mounting means connected to said housing and being operable to mount said housing to a vehicle adjacent the driver;

a flexible elongated member positioned within said housing and extendable therefrom a fixed distance, said member having a distal end portion;

spring means mounted in said housing and connected to said member being operable to retract said member into said housing after said member is released from an extended position;

adjusting means connected to said member being operable to change said fixed distance; and, connecting means connected to said distal end portion of said member being operable to connect said distal end portion to said vehicle when said member extends from the dashboard to the seat adjacent to the driver's right leg limiting movement of the driver's right leg.

2. The device of claim 1 wherein:

said housing includes a top half portion and a bottom half portion secured together with said bottom half portion including a boss projecting upwardly therefrom;

said spring means includes a platform rotatably mounted on said boss and a helically wound flat spring resting upon said platform, said spring has an inner proximal end attached to said boss and an outer distal end attached to said member.

3. The device of claim 1 wherein:

said member is a fabric strap and includes an inner distal end attached to said spring means and a looped outer proximal end portion with said adjusting means located thereon.

4. The device of claim 3 and further comprising:

staples attaching said proximal end portion of said strap to said spring means.

5. The device of claim 4 wherein:

said connecting means includes a hook fixedly mounted thereon, said connecting means further includes a clip removably attached to the driver's seat belt, said clip has a loop formed thereon hookingly engaged with said hook.

6. The device of claim 5 wherein:

said mounting means includes a clasp mounted on said housing and engageable with the vehicle dashboard and further comprising:

a bracket fixedly mounted to said dashboard, said bracket having a wall spaced apart from said dashboard to mountingly receive said clasp between said wall and said dashboard.

* * * * *